Patented Aug. 7, 1928.

1,679,935

UNITED STATES PATENT OFFICE.

GEORGE HOLLAND ELLIS, HENRY CHARLES OLPIN, AND WILLIAM BERTRAM MILLER, OF SPONDON, NEAR DERBY, ENGLAND, ASSIGNORS TO CELANESE CORPORATION OF AMERICA, A CORPORATION OF DELAWARE.

TREATMENT OF CELLULOSE DERIVATIVES.

No Drawing. Application filed August 15, 1927, Serial No. 213,214, and in Great Britain September 30, 1926.

This invention relates to the dyeing, printing or stencilling of threads, yarns, fabrics, films or other products made with or containing cellulose acetate.

We have found that highly useful dyeings, printings or stencillings may be produced on materials made with or containing cellulose acetate by means of nitro derivatives (preferably unsulphonated) of compounds containing two or more aryl radicles or aromatic residues linked together in any way other than by nitrogen alone, such for instance as nitro derivatives of the following classes; $R^1$—$R^2$, $R^1$—NH—$CH_2$—$R^2$, $R^1$—O—$R^2$; $R^1$—$CH_2$—$R^2$, $R^1$—CO—$R^2$,

(Wherein $R^1$ and $R^2$ may be similar or different aryl radicles or aromatic residues); for example nitro derivatives of diphenyls or other diaryls, such as nitro benzidines, nitro tolidines and the like; nitro derivatives of aralkyl-arylamines, such for example as nitro phenyl benzylamines and the like; nitro derivatives of diaryl ethers such for example as nitrophenyl ethers; nitro derivatives of diarylmethanes e. g. nitrodiphenylmethanes; nitro derivatives of diarylketones e. g. nitrobenzophenones; nitro derivatives of carbazoles.

The nitro derivatives of the present invention may or may not contain other substituent groups such as halogen, hydroxy, amino or substituted amino, alkoxyl, methyl, ethyl groups and the like.

The following are some nitro derivatives which may be employed according to the present invention, it being understood that these examples are given only by way of illustration and are in no way limitative:—

| | Shade yielded on cellulose acetate. |
|---|---|
| (A) Directly bound arylnuclei. | |
| 3:3'-dinitro-4:4'-diamino-diphenyl | Yellow. |
| 3-nitro-4:4'-diamino-diphenyl | Yellow. |
| 3:-3'-dinitro-4:-4'-diamino-5:-5'-di-methyl-diphenyl | Yellow. |
| (B) United by means of —NH—$CH_2$—. | |
| 2-:4-Dinitro-phenyl-benzylamine | Bright lemon yellow. |
| 4-Chlor-2-nitro-phenylbenzylamine | Bright golden yellow. |
| 4-nitrophenylbenzylamine | Greenish yellow. |
| 2-nitrophenyl-benzylamine | Bright yellow. |
| (C) United by means of —O— | |
| 3-nitro-4-amino-diphenyl-ether | Bright golden yellow. |
| (D) United by means of —$CH_2$— | |
| 3:-3'-Dinitro-4:-4'-diamino-diphenylmethane | Greenish yellow. |
| 2:-2'-Dinitro-4:-4'-di(dimethylamino) 6:-6'-ditolylmethane | Yellow. |
| (E) United by means of —CO— | |
| 3: -3' - dinitro - 4: - 4' - di(dimethylamino)-diphenyl-ketone | Yellow. |
| (F) Directly bound and united by means of —NH— | |
| Mononitro-carbazole-(mpt 164° C.) | Greenish yellow. |

The nitro derivatives of the present invention may be applied to the goods by any suitable methods; as many are insoluble or of only relatively low solubility in water they are preferably applied according to one of the three methods a, b, or c, following:—

(a) In the form of their soluble or more soluble modifications prepared by pretreating them with one or more of the solubilizing agents of previous U. S. Patents Nos. 1,618,413 and 1,618,414 and U. S. applications S. No. 48,666, S. No. 50,525, S. No. 152,517, S. No. 134,138 and S. No. 176,289.

(b) In the form of suspensions (in presence or absence of protective colloids) produced by finely grinding a powder or aqueous paste of the nitro derivative or derivatives.

(c) In the form of suspensions produced by dissolving the nitro derivative or derivatives in a suitable solvent and adding the solution to or pouring the same into an aqueous bath to which protective colloids may be added to maintain as fine a condition of precipitation or colloidal state as possible.

The preparations of the nitro derivatives prepared in accordance with methods a, b or c above, may be applied to the goods in any suitable concentration and according to known methods of dyeing, printing or stencilling. For printing the preparations may be mixed with any desired thickening agent such as gum arabic, dextrine or the like and the resultant paste applied in any desired manner of printing, the prints may afterwards be dried, steamed or aged and finished as desired or requisite.

While the nitro derivatives are preferably applied in the forms prepared according to a, b or c above, they may be applied in any other suitable way, and where sufficiently soluble in water they may be applied as such or in the form of their salts, from aqueous solutions. In all methods of application the dyeing, printing or stencilling may be performed with the aid of or in conjunction with protective colloids or other known assistants employed in these arts.

It is to be understood that we may if desired employ in conjunction with the nitro derivatives of the present invention any dyestuffs or colouring matters having affinity for or capable of colouring cellulose acetate, such dyestuffs or colouring matters being applied before, after or simultaneously with the application of the said nitro derivatives.

Further, the invention may be applied for the dyeing, printing or stencilling of "mixed" goods made from or containing cellulose acetate associated with cotton, silk, wool, artificial silks of the cellulosic type or other fibres, natural or artificial.

Generally the nitro derivatives of the present invention do not appreciably dye animal or cellulosic fibres; hence differential, resist or uniform effects may be obtained on mixed goods, appropriate dyestuffs for the non-acetate portion of the goods being employed if desired or required.

The following examples serve to illustrate some means of performing the present invention, it being understood that they are in no way limitative.

*Example 1.*

100 grams of 3:3'-dinitro-4:4'-diamino-diphenyl are ground to a fine paste in a suitable mill with 500 grams of water, and added to 5 litres of water containing 500 grams of olive oil soap, the whole being heated to the boil, and stirred till as homogeneous as possible. The dispersion is now diluted to 10 litres with boiling soft water, stirred well and poured through a filter cloth into a dyebath containing 300 litres of soft water. 10 kilogrammes of cellulose acetate yarn in hank form are now added, and dyeing commenced cold, raised to 75-80° C. during ¾ hour and maintained at that temperature a further ¾ hour. The yarn which is now dyed a bright yellow shade, is lifted, washed off thoroughly, and may be dried or otherwise treated as desired.

*Example 2.*

100 grams 2:4-dinitro-phenyl-benzylamine are stirred into a dispersion of 150 grams tetrachlorethane in 600 ccs. sodium sulphoricinoleate (50%). The whole is heated to 80-90° C. with stirring till as homogeneous as possible and diluted to 10 litres with boiling soft water. It is now poured through a filter cloth into a dyebath containing 300 litres of soft water, and poled well. 10 kilogrammes of cellulose acetate yarn in hank form are now added, and dyeing carried out as in Example 1. The yarn which is dyed a bright green-yellow shade, is lifted, rinsed, and dried or otherwise treated as desired.

*Example 3.*

100 grams of 3-nitro-4-amino-diphenyl-ether (obtained by acetylation, nitration and subsequent hydrolysis of 4-amino diphenyl-ether) are ground to a fine powder and intimately mixed with 750 parts of a 50% solution of the sodium salt of a sulpho aromatic fatty acid obtained by sulphonating a mixture of naphthalene and oleic acid. The whole is heated to 80-90° C. and stirred till as homogeneous as possible, diluted with 10 litres with boiling water, and added through a filter cloth to a dyebath containing 300 litres of water. 10 kilogrammes of cellulose acetate in hank form are now entered and dyeing carried out as in Example 1. The goods which are dyed a full golden yellow shade are lifted, rinsed and may be dried or otherwise treated as desired.

*Example 4.*

75 grams 3:3'-dinitro-4:4'-diamino-diphenylmethane are reduced to a fine powder and added to a dispersion of 50 cc. xylene in 400 ccs. sodium sulphoricinoleate (50%). The whole is heated to 80-90° C. with stirring and stirred till as homogeneous as possible. It is then diluted to 10 litres with boiling soft water, stirred well, and poured through a filter cloth into a dyebath containing 300 litres of water. 10 kilogrammes of cellulose acetate yarn in hank form are added, and dyeing carried out as in Example 1. The goods which are now dyed a full greenish yellow shade are lifted, rinsed and dried or otherwise treated as desired.

Example 5.

100 grams of 3:3'-dinitro-4:4'-di(dimethylamino) diphenyl-ketone are ground to a very fine paste with sufficient water in a suitable mill, and added to a dyebath containing 300 litres of a glue solution in water, concentration ⅓rd grams per litre. A suitable machine such as the "reel" will be employed. 10 kilogrammes of cellulose acetate in knit fabric form are entered and the temperature raised to 80° C. during ½ hour being maintained at that temperature a further hour. The goods which are dyed a yellow shade are now lifted, soaped, rinsed and dried or otherwise treated as desired.

Example 6.

100 grams of mono-nitro-carbazole-(M. P. 164° C.) are ground to a fine powder and stirred into 750 grams of sodium sulphoricinoleate (50%). The whole is heated to 80–90° C. with stirring till as homogeneous as possible, diluted to about 10 liters with boiling soft water, and added through a filter cloth to 300 litres of soft water in a suitable machine. 10 kilogrammes of cellulose acetate woven fabric are now entered and dyeing carried out as in Example 1. The goods, which are dyed a bright greenish yellow shade, are lifted, rinsed, and dried or otherwise treated as desired.

Example 7.

75 grams of 4-chlor-2-nitro-phenyl-benzylamine are dissolved in 300 ccs. of boiling methylated spirit and poured with vigorous stirring into 3 litres of a 10% solution of glue at 80° C. The dispersion is now diluted to 10 litres with lukewarm water, and added through a filter cloth to a bath containing 300 litres of water. 10 kilogrammes of cellulose acetate yarn in hank form are now added, and the temperature raised to 75–80° C. in ¾ hour, being maintained at that temperature a further ¾ hour. The goods, which are now dyed a bright golden yellow shade are lifted, rinsed and dried or otherwise treated as desired.

Example 8.

To dye 10 kilogrammes of cellulose acetate in hank form a full yellow shade, 100 grams of 3:3'-dinitro-4:4' dimethylamino-diphenyl-ketone are ground to a fine powder, and added to 1 kilogramme of neutral sodium-sulpho-naphthalene ricinoleate (50%). The whole is now heated to 75–80° C. with stirring till as homogeneous as possible, diluted to 10 litres with boiling water and added to the dyebath containing 300 litres of water. The goods are now entered, the temperature raised to 75–80° C. in ¾ hour and maintained at that temperature for ¾ hour. The goods, which are now dyed a full yellow shade are washed off, and may be dried or otherwise treated as desired.

Example 9.

To dye 20 kilogrammes of cellulose acetate-cotton goods (50%:50%), the cellulose acetate a full golden yellow shade and the cotton a green shade:—

100 grams of 2 nitro-phenyl-benzylamine are finely powdered and intimately mixed with 2 kilogrammes of a 25% resin soap solution (prepared by dissolving about 23 parts of pale commercial resin in 60 parts boiling water by means of sufficient caustic soda to give a clear solution having a faintly alkaline reaction. The mixture is heated to the boil for 5 minutes or till as homogeneous as possible and slowly diluted with boiling water to 20 litres. The whole is now added through a filter cloth to 500 litres of water and the goods entered. The temperature is raised during ¾ hour to 75–80° C. and after dyeing ¾ hour at this temperature the goods are lifted and well washed off. To dye the cotton the goods are now entered into a second dyebath containing 50 grams of the dyestuffs known as Chlorantine fast blue 2GL (S. C. I.) and 50 grams of the dyestuff known as Chrysophenine G (B. D. C.) in solution in 400 litres of water to which 2 kilogrammes of common salt are also added. The temperature is raised slowly to 80–85° C. and maintained at this temperature till dyeing is complete, when the goods are lifted, rinsed and dried or otherwise treated as desired. Alternatively the operation may be completed in the one bath, the cotton colours in appropriate quantities being added in solution to the dyebath, after exhaustion of the cellulose acetate dyestuffs, and dyeing continued till the desired shade is obtained. In this case the addition of common salt is not desirable.

Example 10

To print a bright greenish yellow shade on cellulose acetate, for example, in form of woven or knitted fabric:—

Thickening:—

| | Grams. |
|---|---|
| Dark British gum | 600 |
| Gum arabic (50% aqueous solution) | 600 |
| Water | 800 |
| Total | 2000 |

Colouring matter paste:—

4 grams of 2:4-dinitrophenylbenzylamine are finely ground with 12 ccs. of water. 24 grams of 70% sodium sulphoricinoleate are added and the whole mass heated until dispersion is as complete as possible. This then serves for making up the printing colour paste as follows:—

Printing colour:—
| | Grams. |
|---|---|
| Colour paste (prepared as above) | 40 |
| Soda ash | 5 |
| Ammonium thiocyanate | 20 |
| Water | 40 |
| Thickening (prepared as above) | 295 |
| Total | 400 |

The soda ash dissolved in a little water is added to the colouring matter paste, which is then intimately mixed with the thickening, the ammonium thiocyanate dissolved in water is added and the whole brought to the boil and bulked.

The cellulose acetate fabric is now printed by any known or suitable methods; dried, preferably by hot air, steamed in dry steam for 15–20 minutes, soaped lightly at 60° C., washed in soft water and dried and finished as desired.

The term "dyeing" in the appended claims is to be understood to include printing and stencilling and the term "materials comprising cellulose acetate" to include threads, yarns, fabrics, films or other products made wholly of cellulose acetate or partly of cellulose acetate and partly of other materials such for example as cotton, silk, wool or artificial silks of the cellulosic type. The term "linkage" used in the claims includes the direct bond, such as in diphenyl $C_6H_5$—$C_6H_5$, and linkages containing atoms, as for instance the linkage —C—N— in phenylbenzylamine

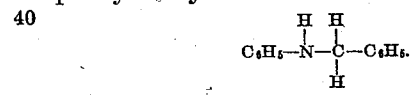

The linkage in phenylbenzylamine is not considered to contain hydrogen, since the hydrogen atoms do not form part of the actual linkage, which is through a nitrogen and a carbon atom alone.

What we claim and desire to secure by Letters Patent is:—

1. Process for dyeing materials comprising cellulose acetate, comprising applying to the materials a nitro derivative of a compound containing at least two aryl radicles linked together by at least one linkage which is at the most only partly constituted by nitrogen.

2. Process according to claim 1, characterized in that the nitro derivative is applied in aqueous solution.

3. Process according to claim 1, characterized in that the nitro derivative is applied in aqueous colloidal solution.

4. Process according to claim 1, characterized in that the nitro derivative is applied in aqueous colloidal solution prepared by pretreating it with a solubilizing agent.

5. Process according to claim 1, characterized in that the nitro derivative is applied in aqueous colloidal solution prepared by pretreating it with a solubilizing agent comprising a body of oily or fatty characteristics.

6. Process according to claim 1, characterized in that the nitro derivative is applied in aqueous colloidal solution prepared by pretreating it with a solubilizing agent comprising a salt of a sulphonated higher fatty acid.

7. Process for dyeing materials comprising cellulose acetate, comprising applying to the materials a nitro derivative of a compound having the general formula $R^1 X R^2$, where $R^1$ and $R^2$ represent the same or different aryl radicles and X represents a direct bond, an oxygen atom, or a methylene, carbonyl, methyleneamino or carbazole coupling.

8. Process according to claim 7, characterized in that the nitro derivative is applied in aqueous solution.

9. Process according to claim 7, characterized in that the nitro derivative is applied in aqueous colloidal solution.

10. Process according to claim 7, characterized in that the nitro derivative is applied in aqueous colloidal solution prepared by pretreating it with a solubilizing agent.

11. Process according to claim 7, characterized in that the nitro derivative is applied in aqueous colloidal solution prepared by pretreating it with a solubilizing agent comprising a body of oily or fatty characteristics.

12. Process according to claim 7, characterized in that the nitro derivative is applied in aqueous colloidal solution prepared by pretreating it with a solubilizing agent comprising a salt of a sulphonated higher fatty acid.

13. Materials comprising cellulose acetate, coloured with a nitro derivative of a compound containing at least two aryl radicles linked together by at least one linkage which is at the most only partly constituted by nitrogen.

14. Materials comprising cellulose acetate, coloured with a nitro derivative of a compound of the general formula $R^1. X. R^2$, where $R^1$ and $R^2$ represent the same or different aryl radicles and X represents a direct bond, an oxygen atom or a methylene, carbonyl, methyleneamino or carbazole coupling.

In testimony whereof we have hereunto subscribed our names.

GEORGE HOLLAND ELLIS.
HENRY CHARLES OLPIN.
WILLIAM BERTRAM MILLER.